United States Patent [19]

Ochiai et al.

[11] Patent Number: 4,696,725

[45] Date of Patent: Sep. 29, 1987

[54] MAGNETIC CORE AND PREPARATION THEREOF

[75] Inventors: Kumi Ochiai, Yokohama; Hiromichi Horie, Yokosuka; Itsuo Arima, Kawasaki; Mikio Morita; Hisato Kamohara, both of Yokohama, all of Japan

[73] Assignee: Kabushiki Kaisha Toshiba, Kanagawa, Japan

[21] Appl. No.: 852,719

[22] Filed: Apr. 16, 1986

[30] Foreign Application Priority Data

Jun. 26, 1985 [JP] Japan ................................ 60-137941
Sep. 12, 1985 [JP] Japan ................................ 60-200565

[51] Int. Cl.$^4$ .......................... C04B 35/04; H01F 1/26

[52] U.S. Cl. .................................... 252/62.54; 264/24; 335/297; 428/458; 428/465; 428/900

[58] Field of Search ........................ 252/62.54; 264/24; 335/297; 428/900, 458, 465

[56] References Cited

U.S. PATENT DOCUMENTS

| | | | |
|---|---|---|---|
| 1,494,070 | 5/1924 | MacKnight | 252/62.54 |
| 1,789,477 | 1/1931 | Roseby | 252/62.54 |
| 1,982,689 | 12/1934 | Polydoroff | 252/62.54 |
| 2,283,925 | 5/1942 | Harvey | 252/62.54 |
| 2,508,705 | 5/1950 | Beller et al. | 252/62.54 |
| 2,563,520 | 5/1951 | Faus | 252/62.54 |
| 2,597,276 | 5/1952 | Altmann | 252/62.54 |
| 2,601,212 | 6/1952 | Polydoroff | 252/62.54 |
| 2,791,561 | 5/1957 | Beller et al. | 252/62.54 |
| 2,883,629 | 4/1959 | Suhl | 252/62.54 |
| 4,502,982 | 3/1985 | Horie et al. | 252/513 |
| 4,543,208 | 9/1985 | Horie et al. | 252/62.54 |
| 4,562,019 | 12/1985 | Inoue | 252/62.54 |

FOREIGN PATENT DOCUMENTS

| | | |
|---|---|---|
| 0088992 | 9/1983 | European Pat. Off. . |
| 47-22514 | 6/1972 | Japan . |
| 47-22515 | 6/1972 | Japan . |

*Primary Examiner*—Arthur P. Demers
*Attorney, Agent, or Firm*—Schwartz, Jeffery, Schwaab, Mack, Blumenthal & Evans

[57] ABSTRACT

Disclosed is a process for producing a magnetic core, comprising the first step of bringing magnetic powder of a metal into contact with a polymer dispersion, followed by drying, to form an insulating layer on the surface of the magnetic powder and the second step of compression molding the magnetic powder. Also, disclosed is a magnetic core produced by the above process.

A magnetic core according to this invention has, since good insulation between magnetic powder particles can be ensured with a small amount of an insulating material, high magnetic flux density, small core loss and excellent frequency characteristics of magnetic permeability and is particularly suitable for use in high frequency range of some 10 KHz or higher.

19 Claims, 1 Drawing Figure

MAGNETIC CORE AND PREPARATION THEREOF

BACKGROUND OF THE INVENTION

This invention relates to a magnetic core and a process for producing the same, more particularly to a magnetic core which is high in magnetic flux density, small in increase of core loss in high frequency region and excellent in frequency characteristics of magnetic permeability, and a process for producing the same.

As a method for production of magnetic cores well known in the art, there is the method in which magnetic powder and a resin are mixed and compression molded, as disclosed in Japanese Patent Publications Nos. 22514/1972 and 22515/1972 and U.S. Pat. Nos. 4,502,982 and 4,543,208. According to such a method, magnetic cores with excellent characteristics, having high saturated magnetic flux density and high magnetic permeability, can be obtained.

On the other hand, uses of such magnetic cores may include, for example, various reactors for power amplifiers, magnetic amplifiers, etc. or uses for transformers. In such uses, a current of considerably high frequency may sometimes flow. For example, in the case of a reactor to be used in a switching circuit, a current of switching frequency which is about some 10 Hz to 200 KHz, or further a current of high frequency of, for example, 500 KHz or higher may sometimes flow. The core loss in the alternating current magnetic characteristics is indicated by the sum of the hysteresis loss and the eddy current loss, and the eddy current loss which is increased in proportion to the second power of frequency becomes predominant as the frequency becomes higher. Accordingly, when use at high frequency is considered, it becomes necessary to suppress the eddy current loss, and the core loss can be made smaller by making the eddy current loss smaller. Also, generally speaking, when the rate of core loss increased is great, magnetic permeability tends to be lowered with increase of frequency. Even so, lowering in the magnetic permeability should desirably be small also in the high frequency region.

Here, according to the method as disclosed in Japanese Patent Publication No. 22514/1972 as mentioned above, while the effects such as high magnetic permeability, high saturated magnetic flux density, etc. can be obtained, low core loss and high magnetic permeability in high frequency regions exceeding 10 KHz could be obtained with difficulty. This may be considered to be due to the fact that the magnetic core was produced by the above method by mixing magnetic powder with a resin, followed by compression molding, whereby the thickness of the polymer layer covering over the surface of magnetic powder is liable to become nonuniform, and the insulation between magnetic particles tends to be unsatisfactory. For improvement of insulation, one may consider to increase the amount of the resin to be mixed, but this approach results in reduced amount of magnetic powder in the magnetic core obtained and, also, the magnetic resistance between magnetic particles will become unnecessarily greater, whereby magnetic characteristics such as magnetic flux density will be lowered.

Thus, in production of magnetic cores, the crucial issue is how to effect efficient and good insulation between magnetic particles.

SUMMARY OF THE INVENTION

This invention has been accomplished in view of the above points, and it is intended to provide a magnetic core which is excellent in frequency characteristics of magnetic permeability and high in magnetic flux density.

The present inventors have studied intensively in order to accomplish the above object and consequently found the fact that an excellent magnetic core can be obtained by providing a dispersion containing polymer particles and metal magnetic powder to which the polymer particles are stuck and, then by drying the metal magnetic powder to form a film layer of the polymer particles on the surface of the metal magnetic powder before compression molding, in place of using a resin as in the prior art during molding of a magnetic core, to develop the process of this invention.

More specifically, the process for producing a magnetic core of this invention comprises the first step of bringing magnetic powder of a metal into contact with a polymer dispersion, followed by drying, to form an insulating layer on the surface of said magnetic powder of a metal and the second step of compression molding said magnetic powder of a metal.

DESCRIPTION OF THE PREFERRED EMBODIMENTS

Figure 1:
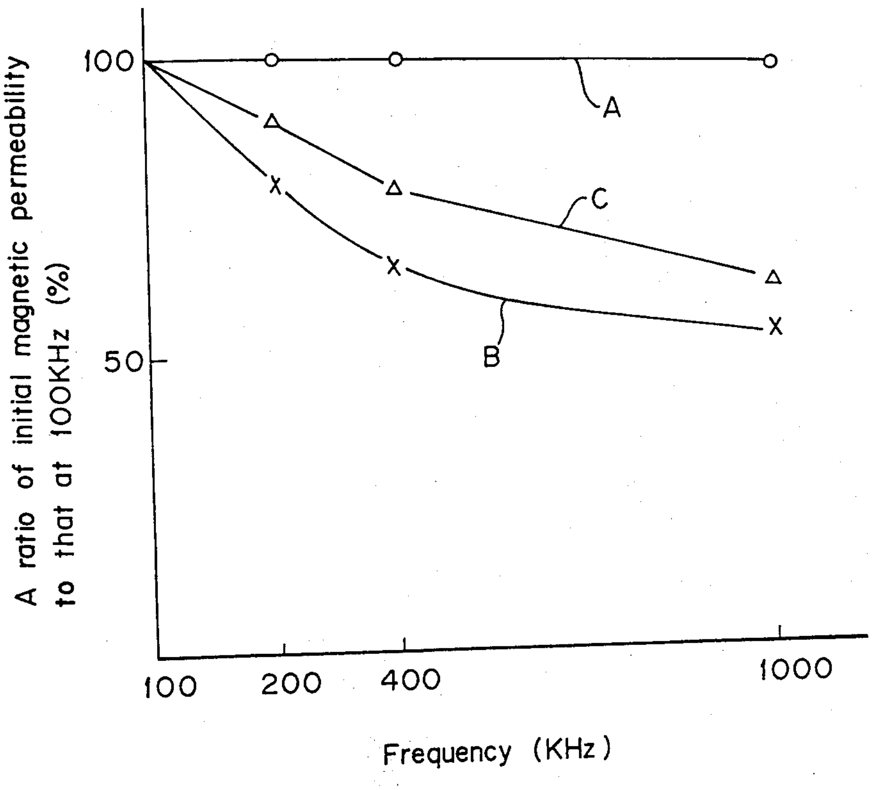
FIG. 1 is a graph showing the initial magnetic permeability characteristics of the magnetic core of Example 2 (curve A), the magnetic core of Comparative example 1 (curve B) and the magnetic core of Comparative example 3 (curve C).

The first step in the process of this invention is the step of forming an insulating layer on the surface of metal magnetic powder.

First, as the metal magnetic powder to be used, there may be shown examples such as pure iron powder, Fe-Si alloy powder (e.g. Fe-3% Si alloy powder), Fe-Al alloy powder, Fe-Si-Al alloy powder, Fe-Ni alloy powder, Fe-Co alloy powder, Fe-based or Co-based amorphous alloy powder, etc. Otherwise, any material which has been used as the material for magnetic core may be available. These magnetic powders may be used either singly or as a mixed system.

The above magnetic powder has an electric resistivity of about 10 $\mu\Omega$.cm to some 10 $\mu\Omega$.cm at the highest. Accordingly, in order to make a magnetic core having satisfactorily good characteristics even in the case of exciting with an alternating current containing high frequency components to give rise to the surface skin effect, these magnetic powders must be made up of fine particles so that most of the portions from the particle surface to the innerside of particles may contribute sufficiently to magnetization. For this reason, in order to obtain a magnetic core which can be excited by a current containing frequency components to about some 10 KHz and is required to have good magnetic permeability characteristics to that frequency range, it is preferred to use magnetic powder having a mean particle size of 300 $\mu$m or less. Also, in order to obtain a magnetic core which can be excited by a current containing frequency components of 100 KHz or higher and is required to have good magnetic permeability characteristics to that frequency range, it is preferred to use magnetic powder having a mean particle size of 100

$\mu$m or less. On the other hand, if the mean particle size is too small, the density of the magnetic core obtained only by application of a usual molding pressure (not higher than 1000 MPa) is low to bring about lowering in magnetic flux density, and therefore the mean particle size of magnetic powder should preferably be 10 $\mu$m or more.

On the other hand, the dispersion to be brought into contact with the above metal magnetic powder is a dispersion comprising fine polymer particles dispersed in a dispersing medium, including, for example, water; organic solvents such as various alcohols, various ketones, etc.; mixed systems of water-organic solvent such as water-alcohol, water-acetone, etc.

These polymer particles comprise a polymer of any one monomer selected from ethylene, styrene, butadiene, vinyl acetate, acrylic acid ester and derivatives thereof; a copolymer of two or more of such monomers; and a fluorine type polymer. Accordingly, examples of these polymer particles may include polyethylene, polystyrene, polybutadiene, polyvinyltoluene, polyisoprene, polychloroprene, polyvinyl acetate, polyethyl acrylate, styrene-butadiene copolymer, styrene-methyl methacrylate copolymer, vinyl fluoride polymer, vinylidene fluoride polymer, trifluorochloroethylene polymer, tetrafluoroethylene polymer, tetrafluoroethylene-hexafluoropropylene copolymer, tetrafluoroethylene-ethylene copolymer, trifluorochloroethylene-ethylene copolymer, tetrafluoroethylene-perfluoroalkyl vinyl ether copolymer, vinylidene fluoride-hexafluoropropene type copolymer rubber, polyfluoroalkyl-containing acrylic (or methacrylic) acid ester type copolymer, etc.

In the dispersing medium as mentioned above, at least one kind of particles of these polymers are dispersed.

These polymer particles have diameters, which are generally uniform, but in the dispersion to be used in this invention, the diameter should desirably be 10 $\mu$m or less at the greatest. The reason is because the thickness of the insulating layer, when these particles are formed into a film during drying treatment as hereinafter described to become an insulating layer between the metal magnetic particles, should desirably be 10 $\mu$m or less. When a thickness of an insulating layer exceeds 10 $\mu$m magnetic resistance between the metal magnetic particles will be higher than is necessary, resulting in magnetic flux density at excitation force of 10,000 A/m which is similar to or less than that of ferrite.

As the method for bringing such a dispersion into contact with magnetic powder, there may be employed in the process of this invention any method in which the polymer particles can be stuck to the magnetic powder surface, including the method in which the dispersion is added dropwise or sprayed onto the magnetic powder under stirring, the method in which metal magnetic powder is immersed into the dispersion and, after stirring, the metal magnetic powder is drawn up, etc. The polymer particles in the dispersion have a high surface charge density and one to several layers will be stuck onto the surface of magnetic powder by bringing the magnetic powder and particles into contact. Therefore, by performing drying later, a thin and homogeneous insulating film can be formed. The concentration of the polymer particles in the dispersion may be suitably controlled to 1 to 60% by weight.

Prior to contact of the metal magnetic powder with the dispersion, in order to assure that the polymer particles well dispersed or stuck onto the metal magnetic powder surface, it is preferred to apply defatting treatment by washing with an organic solvent such as Triclene, Methaclene, etc.; treatment for forming a conversion coating by use of a zinc phosphate solution; or surface treatment by use of a surface treating agent such as titanate type coupling agents, silane type coupling agents, etc. In these treatments, the surface treatment by use of a surface treating agent is especially useful.

The surface treating agent may include, in addition to titanate type coupling agents and silane type coupling agents, aluminum type, indium type, chromium type, and zirconium type coupling agents. These may be added in an amount of 0.3 to 5% by volume of the magnetic powder.

Titanium type coupling agents are titanium compounds comprising at least one readily hydrolyzable group (R) and at least one hardly hydrolyzable group (X) exhibiting lipophilicity bonded to titanium atom (Ti), which are represented by the formula:

$$Rm—Ti—Xn\ (m+n=4 \text{ or } 6,\ 1 \leqq m \leqq 4).$$

The readily hydrolyzable group R may include, for example, monoalkoxy group, residue of oxyacetic acid, residue of ethylene glycol, etc., while X is one or several kinds of lipophilic groups having a hydrocarbon, etc. Titanate type coupling agents may be exemplified by isopropyltri(N-aminoethyl-aminoethyl)titanate, isopropyltriisostearoyl titanate, 4-aminobenzenesulfonyldodecylbenzenesulfonylethylene titanate, tetra(2,2-diallyloxymethyl-1-butyl)bis(ditridecylphosphite)titanate, tetraoctylbis(ditridecylphosphite)titanate, dicumilphenyloxyacetate titanate, and the like.

Silane type coupling agents are silane compound represented by the formula:

$$(RO)_n—\overset{\overset{\displaystyle (CH_3)_{3-n}}{|}}{Si}—X \quad (n = 2 \text{ or } 3).$$

RO is an alkoxy group such as methoxy group and ethoxy group, and X is an organic functional group having an epoxy group, a methacrylic group, an amino group, etc. Silane type coupling agent may be exemplified by $\gamma$-aminopropyltriethoxysilane, $\gamma$-glycidoxypropyltrimethoxysilane, $\beta$-(3,4-epoxycyclohexyl)ethyltrimethoxysilane, N-$\beta$-(aminoethyl)-$\gamma$-aminopropylmethyldimethoxysilane and the like.

After the polymer particles as described above are thus sticked onto the surface of the metal magnetic powder, they are then dried.

By the drying, polymer particles are deformed simultaneously with evaporation of the dispersing medium to be formed into a film, thereby forming an insulating layer covering over the magnetic powder surface. This may be considered to be caused by deformation and fusion of the agglomerated polymer particles by the capillary pressure generated by the dispersing medium remaining in the gaps between the particles.

The above-mentioned drying can be most easily practiced by leaving the coated magnetic powder to stand in the air at a temperature not higher than 100° C., but it is also possible to perform drying in a gas stream or under reduced pressure in order to shorten the steps for manufacturing magnetic cores. Further, for enhancing adhesion between the fused film layer and the metal magnetic powder, heat treatment of about 350° C. or lower may be applied on the metal magnetic powder after drying. The heat treatment time in this case may sufficiently be within one hour.

The second step is the step of compression molding. That is, compression molding is carried out after filling the metal magnetic powder obtained in the step 1 in a desired mold for molding. The pressure to be applied may be about 1,000 MPa or lower, which is industrially readily feasible. After compression molding, by applying optionally heat treatment on the molded magnetic core at a temperature of 350° C. or lower, adhesiveness between the insulating layers of mutually adjacent metal magnetic particles can be advantageously improved.

EXAMPLE 1

While stirring 100 g of Fe-1%Si alloy powder having a mean particle size of 54 μm, 0.5 cc of a dispersion containing 50% by weight of particles of a tetrafluoroethylene-hexafluoropropylene copolymer having a mean diameter of 0.2 μm in water as the dispersing medium was added dropwise thereinto. The alloy powder was left to stand at room temperature for 24 hours for drying.

When the surface of the alloy powder obtained was observed by a scanning type electron microscope (SEM), its surface was found to be coated with a porous film over substantilly the whole surface.

A portion of 20 g of the alloy powder was filled in a mold and compression molded under a pressure of 600 MPa to prepare a magnetic core.

EXAMPLE 2

A magnetic core was prepared in the same manner as in Example 1 except that 100 g of the alloy powder was applied with defatting treatment by use of Methaclene, that thereafter 100 g of the alloy powder was thoroughly mixed with 2% by volume of tetraoctylbis(ditridecylphosphite)titanate as a titanate coupling agent, and that after drying, heat treatment was further applied at 270° C. for 30 minutes.

EXAMPLE 3

After 100 g of Fe-3% Al alloy having a mean particle size of 250 μm as the magnetic powder was stirred in a dispersion containing 40% by weight of particles of a vinylidene fluoride polymer with the maximum particle size of 5 μm in methyl isobutyl ketone as the dispersing medium, the magnetic powder was drawn up. The alloy powder was dried at 200° C. for 15 minutes. A portion of 20 g of the alloy powder obtained was filled in a mold and compression molded under a pressure of 600 MPa to obtain a magnetic core.

EXAMPLE 4

A magnetic core was prepared in the same manner as in Example 3 except for using a dispersion containing 40% by weight of particles of a vinylidene fluoride resin with the maximum particle size of 12 μm in isobutyl ketone as the dispersing medium.

EXAMPLE 5

While stirring 100 g of Fe-1%Si alloy powder having a mean particle size of 54 μm as a magnetic powder, 0.25 cc of a dispersion containing 10% by weight of particles of a polystyrene having a mean diameter of 0.2 μm in water as the dispersing medium was added dropwise thereinto. The alloy powder was left to stand at room temperature for 24 hours for drying, and thereafter heated at 180° C. in the air for 0.5 hours. When the surface of the alloy powder obtained was observed by a scanning type electron microscope (SEM), its surface was found to be coated with a polymer shaped in porous film over substantilly the whole surface.

A portion of 20 g of the alloy powder was filled in a mold and compression molded under a pressure of 600 MPa to prepare a magnetic core. The withdrawing pressure from the mold was measured to be 1,000 kg.

EXAMPLE 6

To 100 g of Fe-1% Si alloy having a mean particle size of 54 μm as the magnetic powder was added 1% by volume of a titanate type coupling agent [isopropyltris(-dioctylpyrophosphate titanate)], and the mixture was thoroughly stirred. Then, 0.25 cc of a dispersion containing 10% by weight of particles of a polystyrene having a diameter of 0.2 μm in water as the solvent, followed by thoroughly stirring. The alloy powder was left to stand at room temperature for 24 hours for drying, and thereafter heated at 180° C. in the air for 0.5 hours.

Of the alloy powder obtained, 20 g was filled in a mold for molding and compression molded under a pressure of 600 MPa to obtain a magnetic core.

EXAMPLE 7

As the magnetic powder, 100 g of Fe-3% Al powder having a mean particle size of 250 μm was immersed and stirred in a dispersion containing 5% by weight of particles of a styrene-butadiene copolymer with the maximum particle size of 5 μm in water-alcohol solvent, and then the alloy powder was drawn up. The alloy powder was dried at 50° C. for 6 hours. The alloy powder obtained was filled in a mold for molding and compression molded under a pressure of 600 MPa to give a magnetic core.

COMPARATIVE EXAMPLES 1 and 2

Each of the Fe-1% Si alloy powder having a mean particle size of 54 μm and the Fe-3% Al alloy powder having a mean particle size of 250 μm was filled in the same mold for molding as used in Examples 1 to 4, and compression molded under a pressure of 600 MPa to prepare a magnetic core. Respective magnetic cores are called Comparative example 1 and Comparative example 2.

In Comparative example 1, the withdrawing pressure from the mold during compression molding exhibited a high value of 2,500 kg, in spite of the entirely the same conditions as in compression molding in Example 5.

COMPARATIVE EXAMPLE 3

The Fe-1% Si alloy powder having a mean particle size of 54 μm was mixed with 5% by volume of a powdery resin (polyamide resin) of 100 mesh-pass, and the resultant mixture was compression molded similarly as in Comparative examples 1 and 2 to prepare a magnetic core.

Measurement of characteristics

For the magnetic cores obtained in the above Examples 1 to 7 and Comparative examples 1 to 3, initial permeability characteristics in high frequency range from 100 KHz to 1 MHz were measured. Also, magnetic flux densities relative to excitation force 10,000 A/m were mesured. Further, effective permeabilities and core losses at 100 KHz and 0.05 T were measured by U function meter.

FIG. 1 shows a graph of ratios of specific magnetic permeabilities at respective frequencies when the initial magnetic permeability at 100 KHz is made 100%, the curve A indicating the changes of Example 2, the curve B those of Comparative example 1 and the curve C those of Comparative example 3. The initial permeability of this invention was lowered very little as compared with Comparative examples, and there was substantially no change within the range measured. The characteristics of the magnetic permeability of Example 6 was substantilly same as those in the curve A. Also, the magnetic cores of Examples 1, 3, 4, 5 and 7, although inferior to Examples 2 and 6, were small in lowering of initial permeability. However, the magnetic core of Comparative example 2 was found to be lowered to greater extent than Comparative example 1.

The magnetic cores of Examples 1, 2, 5 and 6 of this invention have magnetic flux densities of 0.9 T or higher relative to the excitation force of 10,000 A/m, while the magnetic cores of Examples 3 and 7 magnetic flux densities of 0.6 T or higher, thus being higher than that of ferrite, and that of the magnetic core of Example 4 was 0.4 T as equal to that of ferrite. Thus, every magnetic core had a high magnetic flux density equal to or higher than ferrite. Also, the magnetic flux densities of the magnetic cores of these examples were maintained the substantially same values as those at room temperature even in measurements up to the temperature of 250° C.

Table 1 shows the characteristics of the magnetic cores at 100 KHz and 0.05 T measured by U function meter.

TABLE 1

| | Effective permeability (uH/m) | Core loss (W/kg) |
|---|---|---|
| Example 5 | 105 | 244 |
| Example 6 | 115 | 182 |
| Comp. example 3 | 86 | about 800 |

Also, the core losses of the magnetic cores of Examples 1,2,5 and 6 were not more than 250 W/kg, but those of Comparative example 3 was about 800 W/kg, and those of Comparative example 1 was more than 800 W/kg to make the measurement impossible.

As described above, the magnetic cores of Examples 1 to 7 of this invention, while having high magnetic flux densities, are very little in lowering of magnetic permeability in high frequency range. This is because insulation between magnetic particles of a metal in the magnetic cores of Examples 1 to 7 of this invention is good, whereby core loss can be suppressed small.

Further, plate test strips were prepared by compression molding similarly as the magnetic core in Example 1. 10 of the test strips were subjected as such, while the other 10 after heating at 270° C. for one hour, to flexural test. As the result, the heated strips were found to be increased by 1.5-fold in average amount of displacement. Thus, by application of heat treatment after compression molding, mechanical strength can be improved.

As is apparent from the above description, in the magnetic core prepared according to the process of this invention, the metal magnetic powder is coated uniformly with a thin insulating film with a thickness of several microns or less. Accordingly, the magnetic core according to this invention is high in electric insulation between the particles of magnetic powder and hence very small in eddy current loss relative to the alternating current magnetization of the whole magnetic core, which also leads to smaller core loss. For this reason, in said magnetic core, there is scarcely a problem such as heat generation due to small core loss even when employed in high frequency range, and also lowering in effective permeability is small. Also, in the process of this invention, since no large amount of an insulating material is required to be used, the density of the magnetic core is high, and high magnetic flux density can be maintained.

When a fluorine type polymer is used in the insulating layer, the magnetic core of this invention is excellent in heat resistance. Therefore, the limiting use temperature of the magnetic core can be expanded to 150° to 300° C. to give a useful magnetic core.

Also, in the process of this invention, no special equipment for kneading of resins, etc. is necessary, which is generally required for providing an insulating layer on the metal magnetic powder surface.

Further, in the compression molding step, since the surface of the magnetic material is overed with a soft polymer layer, friction between magnetic powder particles with high hardness having unevenness on the surface can be alleviated to improve filling percentage of the molding, with an additional advantage that the withdrawing pressure from the mold after molding can be reduced.

As described above, according to this invention, since good insulation between magnetic particles can be secured with a small amount of an insulating material, a magnetic core with high magnetic flux density, small core loss and excellent frequency characteristics of magnetic permeability can be obtained. Particularly, this invention is applicable preferably for production of a magnetic core which is suitable for use in high frequency range of some 10 KHz or higher.

We claim:

1. A process for producing a magnetic core, consisting essentially of a first step of bringing magnetic powder of a metal into contact with a polymer dispersion comprising polymer particles, followed by drying, to form an insulating layer on the surface of said magnetic powder, and a second step of compression molding said magnetic powder.

2. The process for producing a magnetic core according to claim 1, wherein polymer particles in said polymer dispersion comprise a polymer or a copolymer of ethylene, styrene, butadiene, vinyl acetate, an acrylic acid ester and derivatives of these, and a fluorine type polymer.

3. The process for producing a magnetic core according to claim 1, wherein said polymer particles in said polymer dispersion have a particle size of 10 μm or less.

4. The process for producing a magnetic core according to claim 1, wherein said magnetic powder of a metal has a mean particle size of 10 to 300 μm.

5. The process for producing a magnetic core according to claim 1, further comprising, prior to the first step, the step of treating said magnetic powder with a coupling agent that acts to bind said polymer particles to said surface.

6. A magnetic core produced by a process consisting essentially of a first step of bringing magnetic powder of a metal into contact with a polymer dispersion comprising polymer particles, followed by drying, to form an insulating layer on the surface of said magnetic powder, and a second step of compression molding said magnetic powder.

7. A magnetic core according to claim 6, wherein said core is suitable for use at a frequency of at least 10 KHz.

8. A magnetic core according to claim 6, wherein said metal is selected from the group consisting of pure iron powder, Fe-Si alloy powder, Fe-Al alloy powder, Fe-Si-Al alloy powder, Fe-Ni alloy powder, Fe-Co alloy powder, Fe-based amorphous allowy powder and Co-based amorphous alloy powder.

9. A magnetic core according to claim 6, wherein said polymer particles are comprised, respectively, of a polymer containing at least one monomer from the group consisting of ethylene, styrene, butadiene, vinyl acetate and acrylic acid ester.

10. A magnetic core according to claim 9, wherein said polymer is selected from the group consisting of polyethylene, polystyrene, polybutadiene, polyvinyltoluene, polyisoprene, polychloroprene, polyvinyl acetate, polyethyl acrylate, a styrene-butadiene copolymer and a styrenemethyl methacrylate copolymer.

11. A magnetic core according to claim 9, wherein said polymer is a fluorine-containing polymer.

12. A magnetic core according to claim 11, wherein said polymer is selected from the group consisting of a vinyl flouride polymer, a vinylidene fluoride polymer, a triflurochloroethylene polymer, a tetrafluoroethylene polymer, a tetrafluofoethylene-hexafluoroproplene copolymer, a tetrafluoroethylene-ethylene copolymer, a trifluorochloroethylene-ethylene coploymer, a tetrafluorethylene-perfluoroalkyl vinyl ether copolymer, a vinylidene fluoride-hexafluoropropene copolymer rubber, and polyfluoroalkyl-containing acrylic or (meth)acrylic acid ester copolymer.

13. The process for producing a magnetic core according to claim 5, wherein said coupling agent is a titanate type coupling agent, a silane type coupling agent, an aluminum type coupling agent, an indium type coupling agent, a chromium type coupling agent or a zirconium type coupling agent.

14. The process for producing a magnetic core according to claim 13, wherein said coupling agent is a represented by the formula $$Rm—Ti—Xn$$

wherein

R is a readily hydrolyzable group,

X is a group which is not readily hydrolyzable and which exhibits lipophilicity when bonded to Ti, and m and n fulfill the requirements:

$m+n=4$ or 6

$1 \leqq m \leqq 4$.

15. The process for producing a magnetic core according to claim 14, wherein (i) R is a monoalkoxy group, a residue of oxyacetic acid or a residue of ethylene glycol and (ii) X is a lipophilic hydrocarbon moiety.

16. The process for producing a magnetic core according to claim 14, wherein said titanium compound is selected from the group consisting of isopropyltri(N-aminoethyl-aminoethyl) titanate, isopropyl-triisostearoyl titanante, 4-aminobenzenesulfonyldodecylbenzenesulfonylethylene titanate, tetra(2,2-diallyloxymethyl-1-butyl)bis(ditridecylphosphite) titanate, tetraoctylbis(ditridecylphosphite)titanate and dicumilphenyloxyacetate titanate.

17. The process for producing a magnetic core according to claim 13, wherein said coupling agent is a silane compound represented by the formula $$(RO)_n—\overset{\overset{(CH_3)_{3-n}}{|}}{Si}—X \quad (n = 2 \text{ or } 3)$$

wherein

RO is a alkoxy group,

X is an organic functional group, and n is 2 or 3.

18. The process for producing a magnetic core according to claim 17, wherein organic functional group X comprises an epoxy group, a methacrylic group or an amino group.

19. The process for producing a magnetic core according to claim 18, wherein said silane compound is selected from the group consisting of γ-aminopropyltriethoxysilane, γ-glycidoxypropyltrimethoxysilane, b-(3,4-epoxycylohexyl)ethyltrimethoxysilane and N-β-(aminoethyl)γ-aminopropylmethyldimethoxysilane.

* * * * *